Oct. 29, 1963 A. F. WILLIAMS 3,108,643
TINE CULTIVATOR
Filed Oct. 11, 1961 3 Sheets-Sheet 1
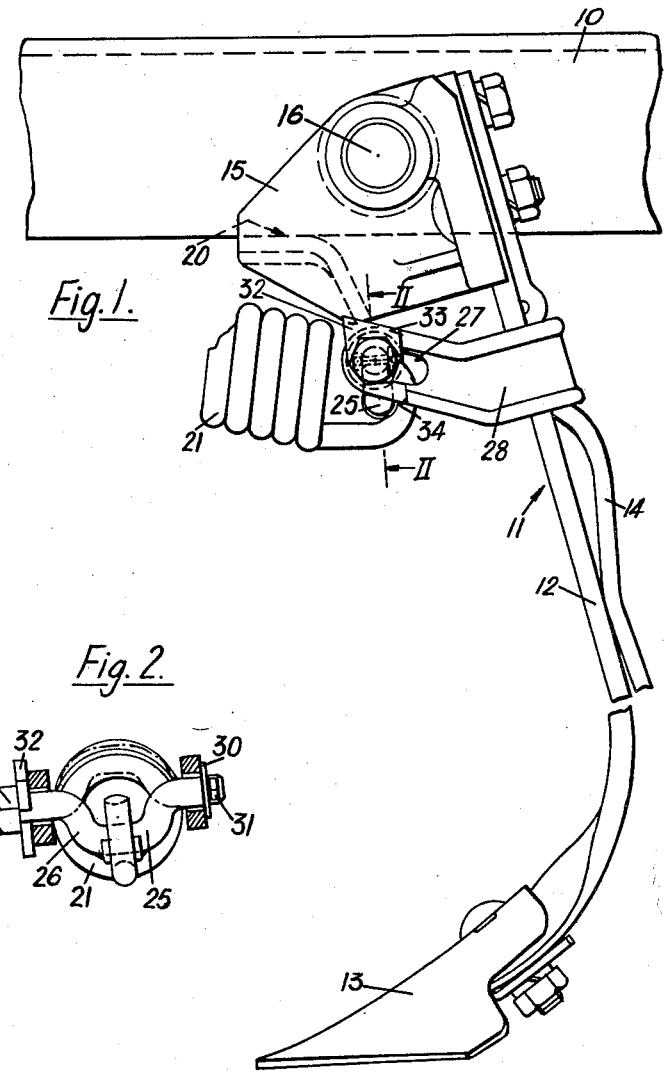
Inventor
ALAN FOULKES WILLIAMS
By
Wolfe, Hubbard, Voit & Osann
Attorneys

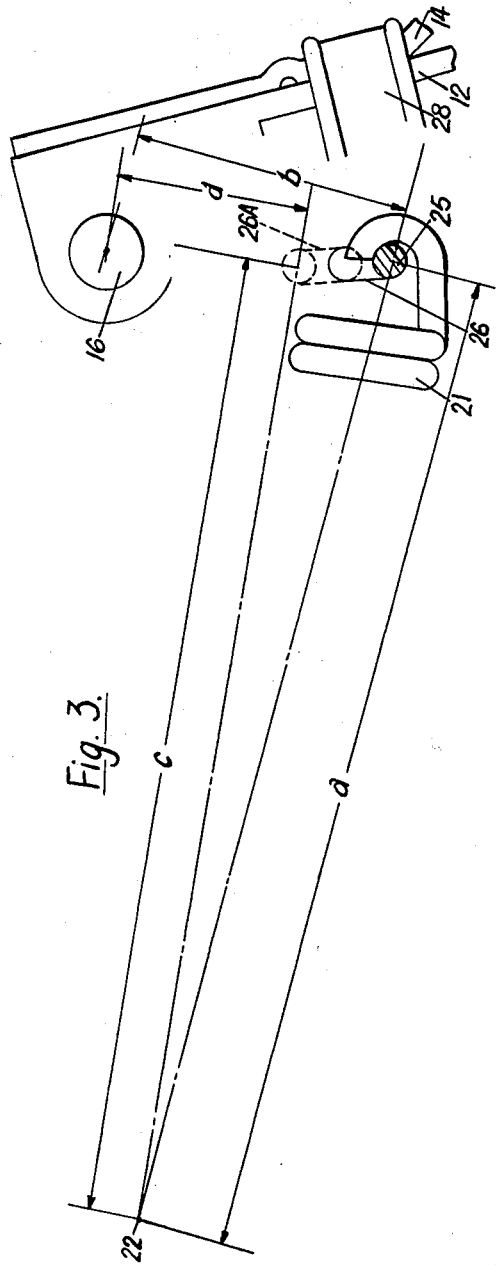

Oct. 29, 1963  A. F. WILLIAMS  3,108,643
TINE CULTIVATOR
Filed Oct. 11, 1961  3 Sheets-Sheet 3
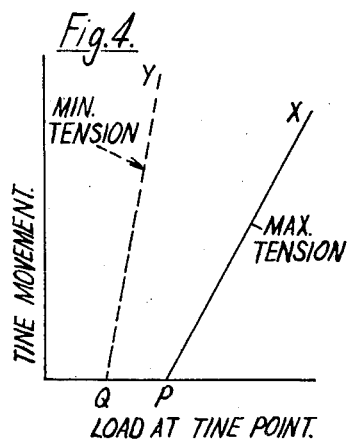
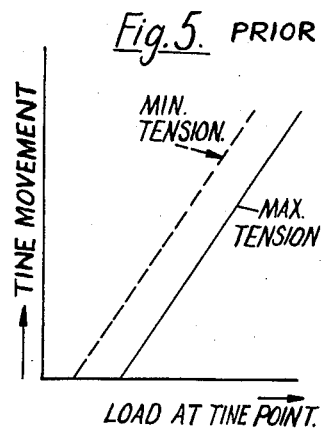
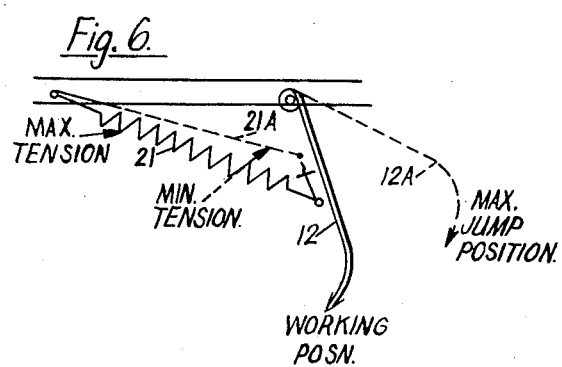
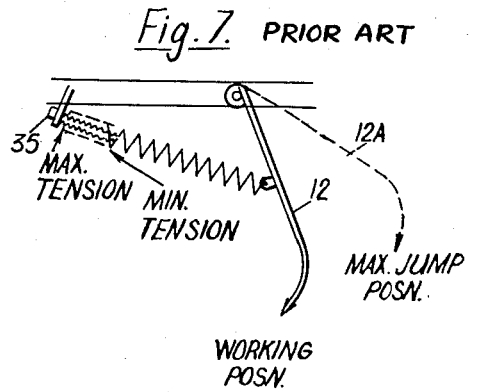
Inventor
ALAN FOULKES WILLIAMS 3,108,643
TINE CULTIVATOR
Alan Foulkes Williams, Strathmore, Victoria, Australia, assignor to Massey-Ferguson (Australia) Limited, Sunshine, Victoria, Australia
Filed Oct. 11, 1961, Ser. No. 144,341
Claims priority, application Great Britain Oct. 14, 1960
7 Claims. (Cl. 172—265)

This invention relates to cultivators of the type in which each tine is substantially rigid and is normally held in its working position by a spring and capable on overload of pivoting rearwards against the action of the spring so as to provide overload release.

It is an object of the present invention to provide a cultivator of the spring release type which is capable of use under a wide variety of soil conditions. It is a more specific object to provide a spring release cultivator which may be adjusted for optimum performance either in firm, packed soil or in loose soil having rocks or stumps.

It is a related object to provide a spring release cultivator which provides stiff release characteristics with a high initial yield force and a high spring rate for operating in firm ground, and which provides soft release characteristics with a lower yield force and lower spring rate when operating in loose soil.

It is another object to provide a spring release cultivator which is easy to adjust and which may be converted from one mode of operation to the other by a simple over-center adjusting arrangement. In this connection it is an object to provide a cultivator which may be switched from one type of operation to the other by a simple throw of a wrench or the like and without the necessity for turning a screw thread.

It is a further object of the invention to provide a spring release cultivator which is safer than conventional cultivators when operating in loose rocky soil and which reduces the hazard to the operator of rocks forcibly propelled by the restoring force of the individual tines.

It is a still further object of the present invention to provide a spring release cultivator which is capable of use in various types of obstruction-ridden soil but which provides for minimizing wear and tear upon the parts of the cultivator for long, trouble-free operation.

It is a specific object of the present invention in carrying out the foregoing to provide a spring release cultivator having provision for simultaneously changing both spring force and spring rate.

Other objects and advantages of the invention will become apparent upon reading the attached detailed description and upon reference to the drawings in which:

FIGURE 1 is a side elevation of a cultivator tine assembly according to the invention.

FIG. 2 is a section on the line II—II of FIG. 1.

FIG. 3 is a diagrammatic view of the top end of the tine assembly, shown in FIG. 1.

FIG. 4 is a graph showing the relationship between a load on the tine point and the tine movement.

FIG. 5 is a graph similar to that shown in FIG. 4, and showing the relationship for a conventional tine assembly.

FIGS. 6 and 7 are diagrammatic views, to a reduced scale, of an assembly according to the invention and a conventional assembly, respectively.

Referring to the drawings and especially to FIG. 1, a part of the cultivator main frame 10 is shown together with a single tine assembly 11. It will be understood that on a cultivator there are usually several of these assemblies spaced apart transversely to the direction of travel of the cultivator. Each tine consists of a long shank 12, to which is attached a digging point 13. The shank 12 is attached to a bracket 15 which is pivoted on a pin 16 attached to the frame 10. A backing spring 14 reinforces the shank 12 and tends to make the assembly substantially rigid. The bracket 15 has an abutment face which contacts a bottoming stop 20 on the underside of the frame 10 to determine the working position of the tine 12. The tine is biased into this position by a spring 21 connected at its forward end 22 to the frame 10 (FIG. 3). In accordance with the present invention, anchoring means are provided for the spring 21 for simultaneously changing the yield force or amount of "prestress" in the spring 21 and for changing the effective spring rate or mechanical advantage of the spring upon the tine. More specifically, means are interposed between the spring 21 and the tine for changing the tightness of the spring and the radius of its effective point of connection with the tine, with both of these factors changing simultaneously and in the same direction. Thus, in the present instance the rear end of the spring is hooked over the central portion 25 of an eccentric in the form of a crank 26, which has its end portions journaled in slots 27 in an arm 28 attached to the tine shank 12. One end of the crank 26 has a hexagonal head 29, for a purpose which will be described later, and the other end is held captive by means of a washer 30 and a locking pin 31. The slots 27 enable the crank to be inserted into position.

In accordance with one of the aspects of the present invention a stop is provided on the crank 26 for positioning the crank in alternative positions on opposite sides of dead center, thereby to define the two modes of spring adjustment. Specifically, a plate 32 is welded to the crank and cooperates, in the position shown in FIG. 1, with an abutment face 33 on the arm 28. The abutment face serves to hold the crank 26 in the position shown in FIG. 1 where the yield force and mechanical advantage, i.e., effective spring rate, are both maximum. A second abutment face 34 is provided in the path of movement of the plate 32 to define the opposite condition of adjustment.

The position of the crank 26 may be altered from that shown in FIG. 1 to the dotted line position shown in FIG. 3 by turning the hexagon head 29 with a wrench in a counter-clockwise direction as viewed in FIG. 1. The crank then goes over center and the plate 32 hits the second abutment face 34 on arm 28.

Referring now to FIG. 3, this diagrammatic figure shows crank 26 in full lines when it is in the position shown in FIG. 1, and in dotted lines in its adjusted position 26A when the plate 32 is against the stop 34. In the full line position, the effective length of the spring 21 when the tine 12 is in the working is $a$, and its moment arm about the pivot 16, which determines the effective spring rate, is $b$. When the crank 26 is in the dotted position, the effective length of the spring is decreased to $c$ and its moment arm is decreased, simultaneously, to $d$. Furthermore, bearing in mind that the length of the spring 21 is an indication of its prestress, and hence the force which must be exerted on it before it will allow the tine 12 to yield, and also that the moment arm of the said force about the pivot 16 is a constant for both positions of the spring 21, it becomes apparent that, when the crank 26 is in its upper position, a small load on the tine moves it, and the tension on the spring 21 does not build up so quickly as when it is in the lower limit position.

The yield forces and spring rates which obtain under the two conditions of adjustment will be more readily understood by referring to the graph of FIG. 4 which may be read in connection with FIG. 6. In FIG. 4, tine movement has been plotted as a function of the load at the tine point. With the device in the mode of adjustment shown in FIG. 1, and which is used for cultivating firm soil, no tine movement occurs until a force is developed at the tine point having a magnitude P. When the force P, conveniently referred to as the yield force, is exerted, the tine retreats away from the bottoming stop 20 with the force characteristics following the line X. The slope of the line X, related to the vertical, is a measure of the effective spring rate, the flatter the slope the less the rate. In the mode of adjustment shown in FIG. 1 the slope, related to the vertical, is maximum and the spring rate is maximum.

Consequently, when the tine is lifted from the bottoming stop the restoring force builds up rapidly with movement of the tine. This is desirable when plowing firm soils where it is desired to maintain the tine in its bottomed working position and to restore the tine to its bottomed working position as promptly as possible when it is unseated therefrom, notwithstanding the presence of high ground reaction forces.

However, when working in loose soils ridden with stones or stumps the device is switched to the opposite mode with the crank swung upwardly and with the spring in its condition of minimum prestress and minimum mechanical advantage or spring rate. Under such conditions, the yield force Q is substantially less than the yield force P. Because of the assumed looseness of the soil the yield force Q will normally not be reached in the absence of stones, stumps or other obstructions. When an obstruction is encountered, the tine retreats rearwardly accompanied by separation at the bottoming stop 20, the force being related to tine movement as indicated by the dotted line Y in FIG. 4. It will be noted in this figure that the slope of the line Y, related to the vertical, is less than the slope of the line of the previous mode of operation. This corresponds to a lesser spring rate so that a lesser build-up of restoring force occurs for a given amount of swinging movement of the tine. Stated in other words, when the tine in the second mode of adjustment is unseated from the stop 20, restoring force is built up in the tine more slowly and with a smaller increment of restoring energy being stored in the spring 21 per unit of tine movement. Thus, there is less energy available for turning rocks and the like into flying missiles as the tine restores itself to its normal working position. As a consequence, there is less hazard to the operator when cultivating loose rocky soils. Moreover, since both the spring force and rate of build-up of spring force are reduced in the second mode of adjustment, the impact forces, and particularly the impact when the tine restores itself to working position, are reduced so that there is less wear and tear on the cultivator. Experience has shown that a cultivator of the present design is inherently longer-lived than conventional cultivators of the spring release type.

By way of comparison with conventional cultivators, reference is made to FIG. 5, which shows the force curves applicable for two conditions of adjustment. A diagram of a conventional cultivator is shown in FIG. 7. In order to provide satisfactory operation under stiff soil conditions, a stiff spring having a high spring rate is normally selected. However, when adjusting a conventional cultivator for operation in loose soil the yield force or prestress is reduced but the effective spring rate remains the same as indicated by the fact that the two curves are parallel to one another. As the result when plowing in loose, obstruction-ridden soil, striking, of an obstruction produces a sharp build-up of restoring force which is found to propel rocks and the like outwardly from the ground and resulting in a hazard to both the operator and the machine itself.

It will be apparent that I have provided a novel spring release cultivator which does not rely simply upon changing the yield force but in which the spring rate is coordinated in a novel fashion with the yield force to provide an important practical advantage when operating in loose, obstruction-ridden soils. Moreover, the device is capable of easy adjustment simply by swinging the crank 26 from the position shown in FIG. 1, in which the plate 32 is in contact with the stop face 33, to an alternate over-center position in which the plate 32 is in contact with the stop face 34. This is to be contrasted with the laborious screw adjustments which are common in conventional cultivators of this type. Keeping in mind that a cultivator includes many separate tines having separate springs, it will be apparent that the present construction enables the farmer to switch from one mode of operation to the other when going from one field to the next in a small fraction of the time normally required to affect an adjustment.

I claim as my invention:

1. In a tine assembly for use on a cultivator, the combination comprising a frame, a substantially rigid tine having a transverse pivot connection with said frame, a bottoming stop for establishing a working position for said tine, a spring connected between said frame and said tine for bottoming the tine on the stop, and means for adjusting the spring thereby to adjust the force required to unseat the tine from the bottoming stop upon the striking of an obstruction, said adjusting means being in the form of an over-center crank interposed between the spring and the tine and so arranged that when the crank is in a first position the spring is effectively connected to the tine at a point of maximum radius on the tine and with a maximum amount of prestress developed in said spring and so that when the crank is in its alternate position the spring is effectively connected to the tine at a point of lesser radius and with a lesser degree of prestress developed in said spring.

2. In a tine assembly for use on a cultivator, the combination comprising a frame, a substantially rigid tine having a transverse pivot connection with said frame, a bottoming stop on said frame for establishing a working position for said tine, a spring connected between said frame and said tine for bottoming the tine on the stop, and means for adjusting the spring thereby to adjust the force required to unseat the tine from the bottoming stop upon the striking of an obstruction, said adjusting means including an over-center crank for adjusting the radial position of anchoring of the spring to the tine thereby changing the effective spring rate.

3. In a tine assembly for use on a cultivator, the combination comprising a frame, a substantially rigid tine having a transverse pivot connection with said frame, a bottoming stop on said frame for establishing a working position for said tine, a spring connected between said frame and said tine for bottoming the tine on the stop, and means including an over-center crank for adjusting the radial position of anchoring of the spring on the tine, the spring being angled with respect to the tine so that changing of said radial position the while maintaining a fixed connection to the frame produces a simultaneous increase in the effective spring rate and prestress in the spring.

4. In a tine assembly for use on a cultivator, the combination comprising a frame, a substantially rigid tine having a transverse pivot connection with said frame, a bottoming stop on said frame for establishing a working position for said tine, a spring connected between said frame and said tine for bottoming the tine on the stop, and adjusting means for said spring, said adjusting means including an over-center crank rotatable between a first position in which the yield force and spring rate are both high and a second position in which the yield force and spring rate are both relatively low.

5. In a tine assembly for use on a cultivator, the combination comprising a frame, a substantially rigid tine having a transverse pivot connection with said frame, a bottoming stop for establishing a working position for said tine, a spring connected between said frame and said tine for bottoming the tine on the stop, means for adjusting the spring thereby to adjust the force required to lift the tine from the bottoming stop upon the striking of an obstruction, said adjusting means including a two-position crank member on the tine rotatable between a first position in which the yield force and spring rate are both high and a second position in which the yield force and spring rate are both relatively low.

6. In a tine assembly for use on a cultivator, the combination comprising a frame, a substantially rigid tine having a transverse pivot connection with said frame, a bottoming stop on said frame for defining the working position of the tine, a spring connected between the frame and the tine for maintaining the tine seated on said bottoming stop until a predetermined yield force is achieved on the tine, a bracket rigidly secured to said tine and having parallel walls with registering apertures therein, a crank having its ends journaled in said apertures and having an offset central portion, said spring being engaged with said central portion, said crank having a two-position stop providing a first position of adjustment in which the central portion of the crank extends downwardly to provide maximum yield force and maximum mechanical advantage and a second position of adjustment in which the central portion of the crank extends upward to provide a minimum yield force and minimum mechanical advantage.

7. In a tine assembly for use on a cultivator, the combination comprising a frame, a substantially rigid tine having a transverse pivot connection with said frame, a bottoming stop on said frame for defining the working position of the tine, a spring interconnected between the frame and the tine for maintaining the tine seated on said bottoming stop until a predetermined yield force is achieved on the tine, a bracket rigidly secured to said tine, a crank having its ends journaled in said bracket and having an offset central portion, said spring being engaged with said central portion, said crank having a two-position stop providing a first position of adjustment in which the central portion of the crank extends downwardly and a second position of adjustment in which the central portion of the crank extends upwardly, and means on the crank for manually throwing the crank from one position to the other.

References Cited in the file of this patent

UNITED STATES PATENTS

| | | |
|---|---|---|
| 1,287,960 | Gleiche | Dec. 17, 1918 |
| 1,524,369 | Ramage | Jan. 27, 1925 |
| 1,627,537 | Yackley | May 3, 1927 |
| 1,900,440 | Ferguson | Mar. 7, 1933 |

FOREIGN PATENTS

| | | |
|---|---|---|
| 87,803 | Denmark | Sept. 7, 1959 |
| 603,356 | France | Jan. 8, 1926 |
| 709,014 | France | May 11, 1931 |
| 36,363 | France | Feb. 11, 1930 |

(Addition to No. 603,356)